United States Patent
Hanada

[11] Patent Number: 5,833,040
[45] Date of Patent: Nov. 10, 1998

[54] INTERNAL BICYCLE TRANSMISSION WITH A COASTER BRAKE

[75] Inventor: Mitsugu Hanada, Shimonoseki, Japan

[73] Assignee: Shimano, Inc., Osaka, Japan

[21] Appl. No.: 806,197

[22] Filed: Feb. 26, 1997

[30] Foreign Application Priority Data

Mar. 15, 1996 [JP] Japan .................................. 8-058786

[51] Int. Cl.$^6$ ................................................. B62M 11/16
[52] U.S. Cl. ........................................... 192/6 A; 475/297
[58] Field of Search ........................... 192/6 A; 475/297, 475/299

[56] References Cited

U.S. PATENT DOCUMENTS

| | | | |
|---|---|---|---|
| 3,937,309 | 2/1976 | Schulz et al. | 192/6 A |
| 3,973,451 | 8/1976 | Kine | 192/6 A X |
| 4,147,243 | 4/1979 | Segawa et al. | 192/6 A |
| 4,323,146 | 4/1982 | Fukui | 192/6 A |
| 4,973,297 | 11/1990 | Bergles | 192/6 A X |

*Primary Examiner*—Richard M. Lorence
*Attorney, Agent, or Firm*—James A. Deland

[57] ABSTRACT

A hub transmission with a coaster brake unit includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The gear rack includes a depression formed in a peripheral direction thereof, and the ring gear includes a serration formed in a peripheral direction thereof. A clutch having an engagement component is movable in a direction of an axis of the axle between a first position, a standby position and a second position. The engagement component engages with the depression in the gear rack for transmitting rotational power to the gear rack when the clutch is located in the first position and the standby position, and the engagement component engages with the serration in the ring gear for transmitting rotational power to the ring gear when the clutch is located in the second position. A biasing mechanism biases the clutch from the second position toward the standby position, and a forcible movement mechanism forcibly moves the clutch from the standby position toward the second position when forward rotational power is applied to the drive member.

22 Claims, 10 Drawing Sheets

INTERNAL BICYCLE TRANSMISSION WITH A COASTER BRAKE

BACKGROUND OF THE INVENTION

The present invention is directed to bicycle transmissions and, more particularly, to an internal bicycle transmission which includes a coaster brake unit.

An internally mounted bicycle transmission which includes a coaster brake unit is disclosed in U.S. Pat. No. 3,937,309. This internal hub includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The transmission provides three speeds depending upon the axial position of a clutch unit that is coupled to a driving member. More specifically, a high speed is provided when the clutch is linked to the gear rack such that the forward rotational power from the driver is transmitted from the planet gear attached to the gear rack to the hub body via the ring gear. A medium speed is provided when the clutch body is linked to the ring gear and the forward rotational power from the driver is transmitted from the ring gear directly to the hub body. A low speed step is provided when the clutch body is linked to the ring gear and the forward rotational power from the driver is transmitted to the hub body the ring gear, the planet gear, and the gear rack.

Such transmissions ordinarily include a coaster brake unit, wherein the reverse rotational power from the driver causes a brake cone provided to the gear rack to move in the axial direction. This movement of the brake cone in the axial direction causes a brake shoe to expand, thus producing a braking action. Unfortunately, the reverse rotational power from the driver must proceed through the same transmission path used for forward rotation of the driver. Thus, for a given force applied to the pedals in the braking direction, a different braking force will be applied to the wheel depending on the transmission path selected at the time of braking. As a result, there is a risk that the resulting braking force applied to the wheel will be different from what the rider intended and may be insufficient or too much.

SUMMARY OF THE INVENTION

The present invention is directed to an internally mounted bicycle transmission which includes a coaster brake unit wherein the braking force applied to the wheels is the same regardless of the selected transmission path. In one embodiment of the present invention, a hub transmission with a coaster brake unit includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The gear rack includes a depression formed in a peripheral direction thereof, and the ring gear includes a serration formed in a peripheral direction thereof. A clutch having an engagement component is movable in a direction of an axis of the axle between a first position, a standby position and a second position. The engagement component engages with the depression in the gear rack for transmitting rotational power to the gear rack when the clutch is located in the first position and the standby position, and the engagement component engages with the serration in the ring gear for transmitting rotational power to the ring gear when the clutch is located in the second position. A biasing means biases the clutch from the second position toward the standby position, and a forcible movement means forcibly moves the clutch from the standby position toward the second position when forward rotational power is applied to the drive member.

In a more specific embodiment, the depression is defined by a contact surface, a side surface and a bottom surface formed on an annular portion of the gear rack. The forcible movement means is formed by an inclined surface located adjacent to the contact surface of the depression for contacting the engagement component and pushing the clutch toward the serration when forward rotational power is applied to the drive member and the engagement component is located in the standby position. The ring gear is movable in the direction of the axis of the axle, and a ring gear biasing means biases the ring gear toward the gear rack. The serration includes an inclined surface for contacting the engagement component and pushing the ring gear in the direction of the axis of the axle against the force of the ring gear biasing means when reverse rotational power is applied to the drive member. This, in turn, returns the engagement component to the standby position. As a result, reverse rotational power always is directly applied to the gear rack to produce the same braking force to the coaster brake regardless of the transmission path selected.

DETAILED DESCRIPTION OF THE EMBODIMENTS

Figure 1:
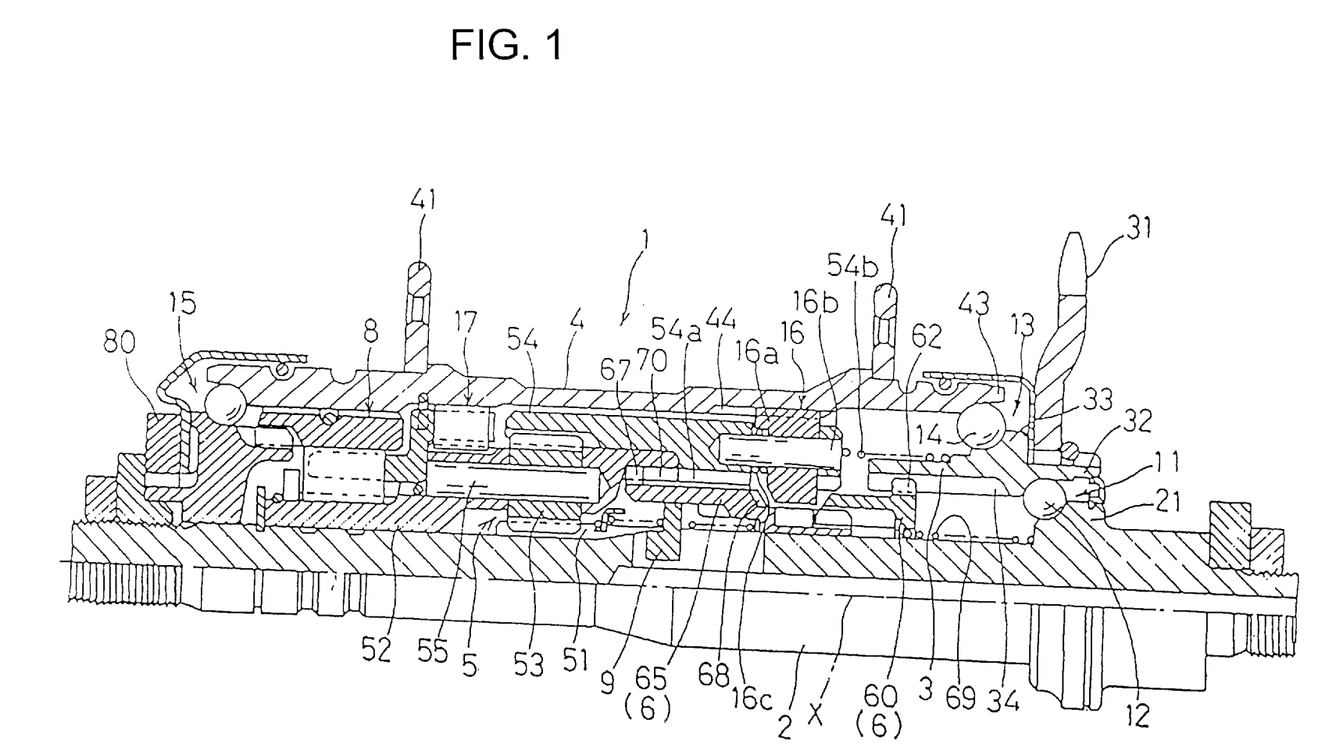
FIG. 1 is a partial cross sectional view of a particular embodiment of an internally mounted bicycle transmission which includes a coaster brake unit according to the present invention.

FIG. 1 is a partial cross sectional view of a particular embodiment of an internally mounted bicycle transmission which includes a coaster brake unit according to the present invention. The transmission 1 comprises a hub axle 2 that is fixed to the bicycle frame and has an axis X; a driver 3 and a hub body 4 that are supported by the hub axle 2 such that they can rotate about the axis X; a planet gear mechanism 5 that transmits power between the driver 3 and the hub body 4; a clutch body 6 that selectively switches the power transmission path between the driver 3 and the hub body 4 used by planet gear mechanism 5; and a roller brake 8, which is itself known as a coaster brake unit.

The driver 3, which functions as the input component for this internal hub transmission 1, has provided around its outer peripheral surface a sprocket 31 that receives the power transmitted by a chain. Further, the internal hub transmission 1 is equipped with a first ball bearing mechanism 11 comprising an outer race 32 formed around the inner peripheral surface of the driver 3 between the driver 3 and the hub axle 2, an inner race 21 formed in the hub axle 2, and balls 12 positioned between these two races.

The hub body 4, which functions as the output component for this internal hub transmission, has formed around its outer peripheral surface a pair of hub flanges 41 that are used to link the spokes (not shown) of a bicycle wheel. Further, the internal hub transmission 1 is equipped with a second ball bearing mechanism 13 comprising an outer race 43 formed around the inner peripheral surface of the hub body 4 between the hub body 4 and the driver 3, an inner race 33 formed around the outer peripheral surface of the driver 3, and balls 14 positioned between these two races. A similar third ball bearing mechanism 15 is provided between the hub body 4 and a brake arm 80 that is fixed to the hub axle 2.

Figure 10:
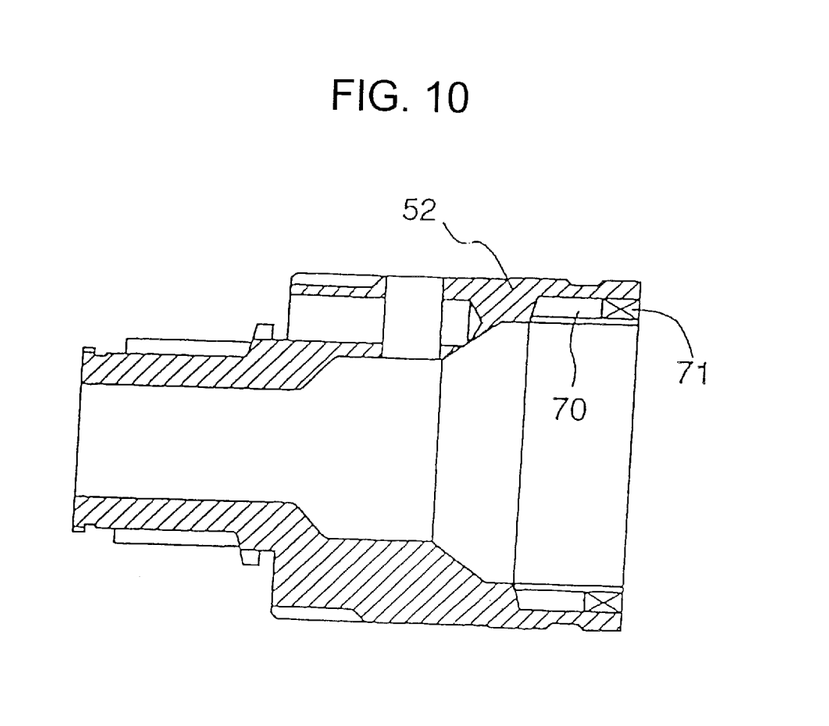
FIG. 10 is a cross sectional side view of a particular embodiment of a gear rack used in the transmission shown in FIG. 1.
Figure 11:
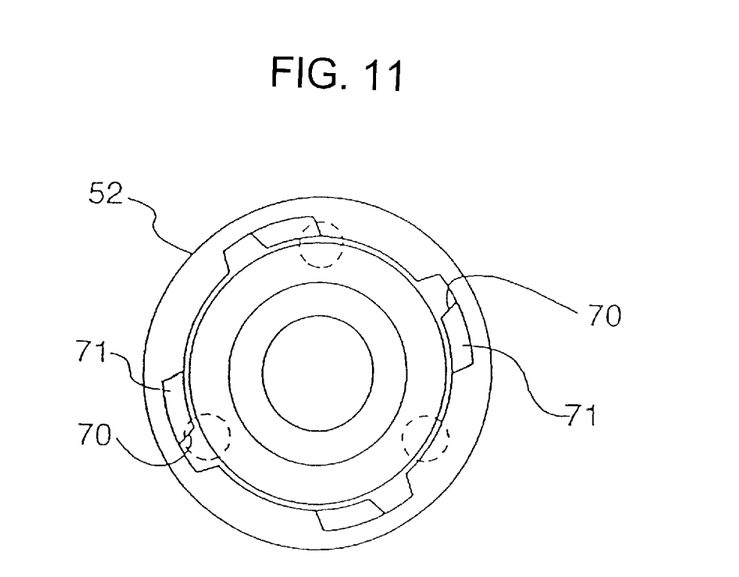
FIG. 11 is a plan view of the gear rack shown in FIG. 10.
Figure 12:
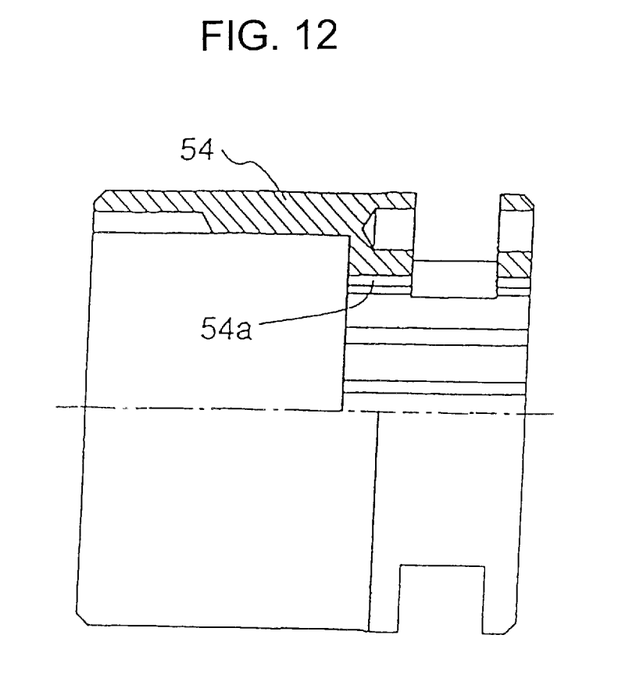
FIG. 12 is a cross sectional side view of a particular embodiment of a ring gear used in the transmission shown in FIG. 1.
Figure 13:
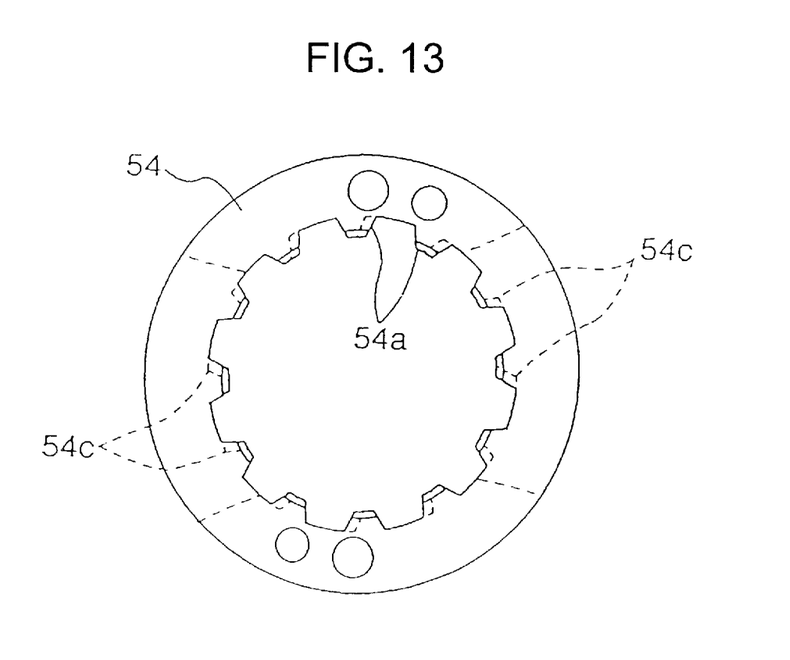
FIG. 13 is a plan view of the ring gear shown in FIG. 12.

The planet gear mechanism 5 is made up of a sun gear 51 formed around the outer peripheral surface of the hub axle, three planet gears 53 arranged in the peripheral direction so as to mesh with this sun gear 51, a cylindrical gear rack 52 that makes use of a gear shaft 55 to rotatably support these planet gears 53, and a ring gear 54 that meshes with these planet gears 53. The details of the gear rack 52 are shown in FIGS. 10 and 1 1, while the details of the ring gear 54 are shown in FIGS. 12 and 13.

The ring gear 54 is constructed such that it can move along the axis X, and it is energized by a coil spring 54b toward the gear rack 52. One end of the ring gear 54 is provided with a pawl clutch 16 that functions as a one-way clutch that transmits rotation in the drive direction of the bicycle. This pawl clutch 16 is itself known, and it is made up of an oscillating pawl 16a that meshes with a ratchet 44 formed around the inner peripheral surface of the hub body 4, a support pin 16b that oscillatably attaches this oscillating pawl 16a to the ring gear 54, and a pawl spring 16c that energizes this oscillating pawl 16a in the engagement direction. A roller clutch 17 that functions as a one-way clutch that transmits rotation in the drive direction of the bicycle is provided between the gear rack 52 and the hub body 4. In other words, the transmission of power from the planet gear mechanism 5 to the hub body 4 goes through two paths, namely, a transmission path from the ring gear 54 to the hub body 4 via the pawl clutch 16, and a transmission path from the gear rack 52 to the hub body 4 via the roller clutch 17.

Figure 14:
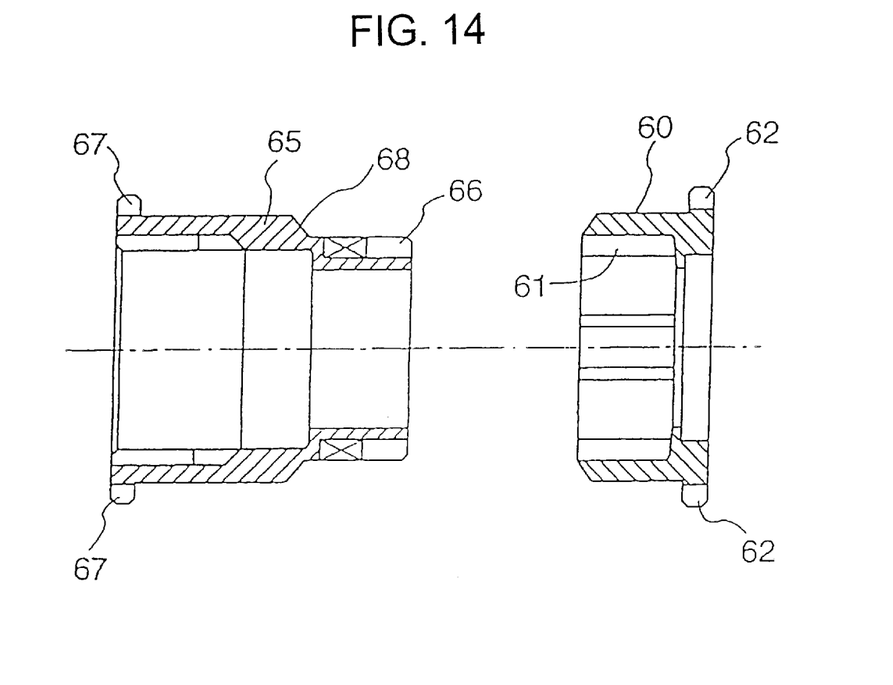
FIG. 14 is a cross sectional side view of a particular embodiment of a clutch body used in the transmission shown in FIG. 1.
Figure 15:
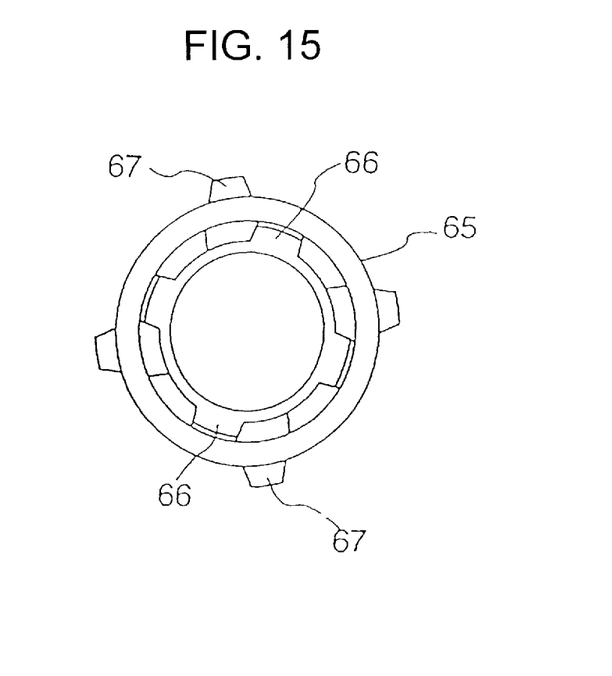
FIG. 15 is a plan view of the clutch body shown in FIG. 14.

The switching between the above-mentioned two transmission paths is performed by the clutch body 6. Clutch body 6 may be set to a first position, an intermediate position, and a second position in the direction of the axis X using a clutch operator 9 that is connected to a shifter unit by means of a shift cable (not shown). To this end, the clutch body 6 is able to move along the axis X and is able to rotate on the hub axle 2. The clutch body 6 in this embodiment comprises a first clutch member 60 and a second clutch member 65 as shown in FIGS. 14 and 15. In order for the two members to be linked such that torque transmission is possible, an inner spline component 61 is provided to one end of the first clutch member 60, an outer spline component 6 is provided to one end of the second clutch member 65, and the engagement of these spline components 61 and 66 integrates the two members 60 and 65 such that torque transmission is possible. The other end of the first clutch member 60 is provided with an outer spline component 62 that engages with an inner spline component 34 formed around the inner peripheral surface of the driver 3. As a result, the first clutch member 60 rotates integrally with driver 3 and is able to slide in the direction of the axis X with respect to the driver 3.

A step 68 that interacts with the oscillating pawl 16a is provided around the outer peripheral surface of the second clutch member 65. This step 68 acts on the oscillating pawl 16a and knocks it down when the clutch body 6 moves to the right from the first position and reaches the intermediate position, which disengages the oscillating pawl 16a and the ratchet 44. The shape of this step 68 is designed such that the step 68 will act on the oscillating pawl 16a within the range of movement of the clutch body 6 from the intermediate position to the second position, and will keep the oscillating pawl 16a lying down.

Four engagement components 67 that project outward in the radial direction are arranged in the peripheral direction at the other end of the second clutch member 65. These engagement components 67 engage with twelve serrations 54a in the form of axial grooves formed and arranged in the peripheral direction around the inner peripheral surface of the ring gear 54, or with four depressions 70 in the form of axial grooves formed and arranged in the peripheral direction around the inner peripheral surface of the gear rack. More specifically, the engagement components 67 are engaged with the depressions 70 of the gear rack when the clutch body 6 is positioned at the first position and the intermediate position, and the engagement components 67 are engaged with the serrations 54a of the ring gear 54 when the clutch body 6 is moved to the right (in FIG. 1) and positioned in the second position.

The relation between the serrations 54a of the ring gear 54, the depressions 70 of the gear rack, and the engagement components 67 of the clutch body 6 will be described through reference to FIGS. 6 through 9. These figures are schematic diagrams used for description, and although the shapes of the depressions 70 and the serrations 54a are actually such that they are disposed in the peripheral direction, they are shown here in developed form. The arrows in the figures indicate the drive direction of the bicycle. Rotation in this direction is often called forward rotation in this specification, and rotation in the opposite direction is called reverse rotation.

The depression 70 is essentially formed from a contact surface 72 with the inclined guide surface 71 that makes up the side surface on the forward rotational direction side, a side surface 74 on the forward rotational side, and a bottom surface 73. The inclined guide surface 71 will be discussed in detail below, but it is formed as a forced movement means for moving the engagement component 67 of the clutch body 6 positioned at the stand-by position toward the serrations 54a of the ring gear 54 at the start of forward rotational power transmission. When the clutch body 6 is positioned at the first position, the engagement component 67 comes into contact with the contact surface 72 at the position a indicated by the solid line in FIG. 6, and the forward rotational power and the reverse rotational power of the driver 3 are transmitted to the gear rack 52. When the clutch body 6 is positioned at the intermediate position, the engagement component 67 comes into contact with the contact surface 72 at the position b indicated by the solid line in FIG. 7, and the forward rotational power and the reverse rotational power of the driver 3 are transmitted to the gear rack 52. When the clutch body 6 is positioned at the stand-by position, the engagement component 67 comes into contact with the contact surface 74 at the position c indicated by the solid line in FIG. 8, and the reverse rotational power of the driver 3 is transmitted to the gear rack 52. When the clutch body 6 is positioned at the second position, the engagement component 67 comes into contact with the serrations 54a at the position d indicated by the solid line in FIG. 9, and the forward rotational power of the driver 3 is transmitted to the ring gear 54.

When the pedal is depressed and, as a result, the engagement component 67 rotates in the drive direction in a state in which the engagement component 67 of the clutch body 6 positioned at the stand-by position has entered the depression 70, the engagement component 67 comes into contact with the inclined guide surface 71, and as a result of this incline it slides along the axial direction and toward the ring gear 54. When it slides over the inclined guide surface 71 until it is in contact with the ring gear 54, the engagement component 67 enters the serration 54a upon reaching a phase relationship that matches that of the serration 54a, and the forward rotational power of the driver 3 is transmitted to the ring gear 54. In order to obtain a phase relationship in which the engagement component 67 matches up with the serration 54a while the engagement component 67 slides over the inclined guide surface 71 and next depression 70 subsequent thereto, the peripheral direction distance D 1 from the inclined guide surface 71 to the next depression 70 is set so as to be greater than the peripheral direction pitch D2 of the serration 54a. Furthermore, the ring gear 54 may move in the direction of the axis X to accommodate the engagement component 67 until the engagement projection 67 enters the serration 54a. This allows the engagement component 67 to move between the gear rack 52 and the ring gear 54 without the engagement component 67 becoming pinched between the gear rack 52 and the ring gear 54.

When the pedal is rotated backward for braking and, as a result, the engagement component 67 is rotated in the opposite direction from the drive direction in a state in which the clutch body 6 is positioned in the second position and the bicycle is being driven forward, that is, in a state in which the engagement component 67 is engaged with the ring gear 54 at the position inside the serration 54a indicated by d, the engagement component 67 comes into contact with the inclined surface 54c formed on the side surface of the reverse rotational direction side of the serration 54a, the ring gear 54 is moved away from the gear rack 52 against the energizing force of the coil spring 54b, and the engagement component 67 itself also enters the depression 70. For the sake of this movement of the engagement component 67 from the serration 54a to the depression 70, an energizing spring 69 is provided as an energization means for energizing the clutch body 6 in the gear rack direction. The engagement component 67 that is in contact with the side surface 74 of the depression 70 transmits the reverse rotational power to the gear rack 52 and actuates the roller brake 8.

The operation of the three-speed internal hub with a coaster brake unit in the embodiment discussed above will now be described.

Figure 2:
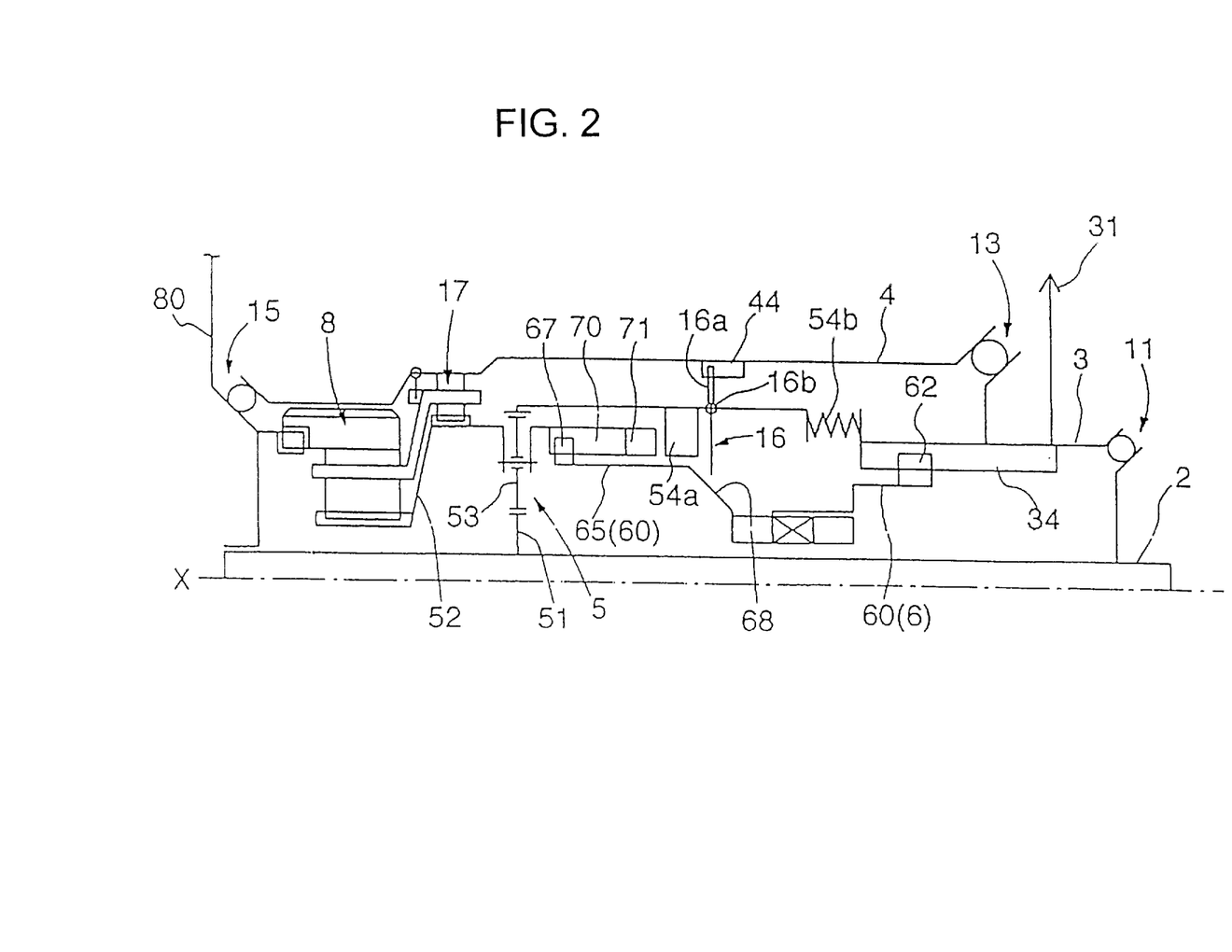
FIG. 2 is a schematic view of the transmission shown in FIG. 1 in a high speed state.
Figure 6:
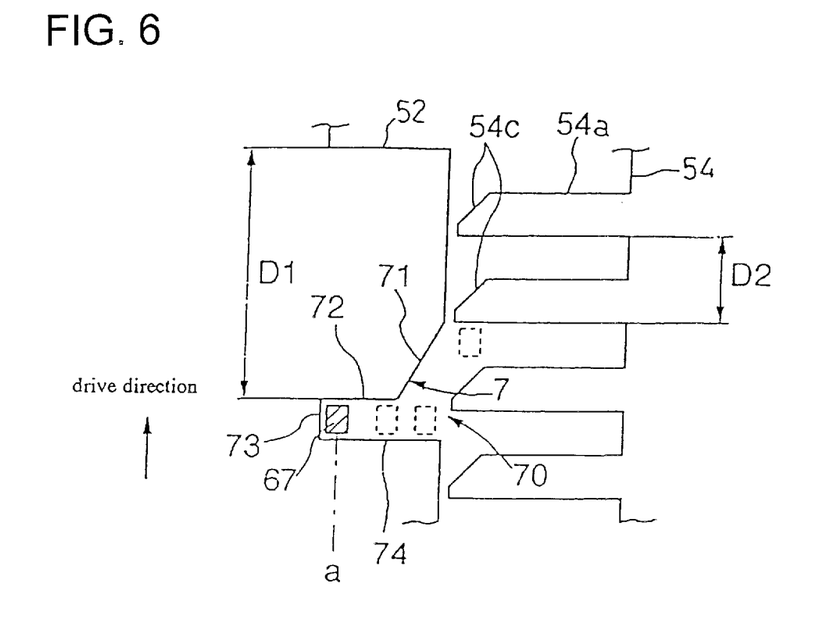
FIG. 6 is a detailed diagram showing the position of an engagement component of a clutch in relation to a depression formed in the gear rack and a serration formed in a ring gear when the transmission is in a high speed state.

The high speed step can be realized by setting the clutch body 6 to the first position, that is, by setting the engagement component 67 to the a position. This state is shown in FIGS. 2 and 6. The forward rotational power received by the driver 3 through the chain is transmitted via the clutch body 6 to the gear rack 52, which is engaged with the engagement component 67 of the clutch body 6. Since the oscillating pawl 16a of the pawl clutch 16 is engaged with the ratchet 44 by the pawl spring 16c, the forward rotational power imparted to the gear rack 52 is boosted through the work of the planet gears 53 and the sun gear 51 before being transmitted to the ring gear 54, and is then transmitted to the hub body 4 through the pawl clutch 16. Since the speed of the hub body 4 is greater than the speed of the gear rack 52, the roller clutch 17 overruns. When the pedal is turned backward in this state in order to brake, the engagement component 67 hits the side surface 74 of the depression 70 and transmits the reverse rotational power to the gear rack 52. When the gear rack 52 is driven backward, the roller clutch 17 is actuated and the hub body is braked.

Figure 3:
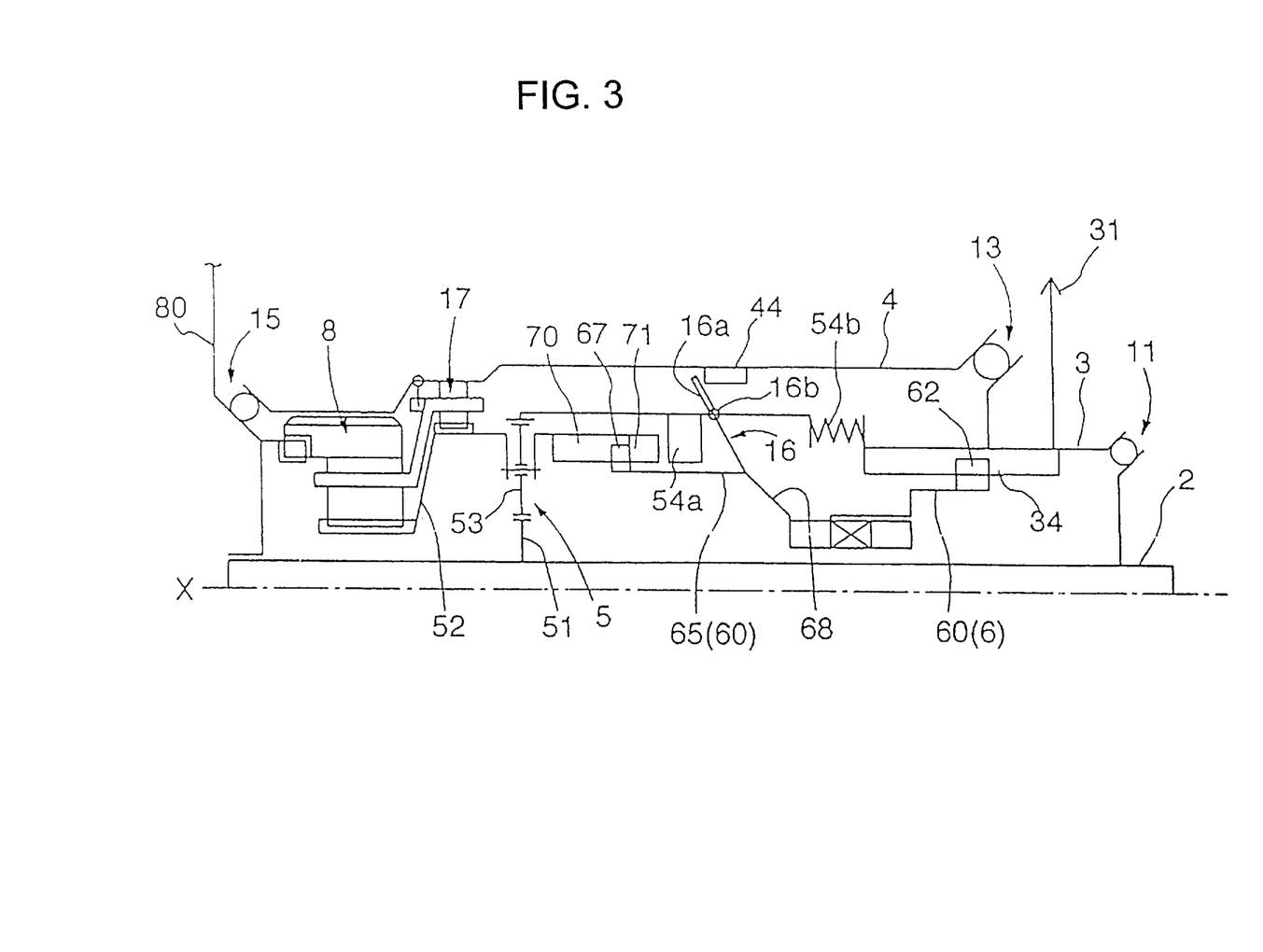
FIG. 3 is a schematic view of the transmission shown in FIG. 1 in a medium speed state.
Figure 7:
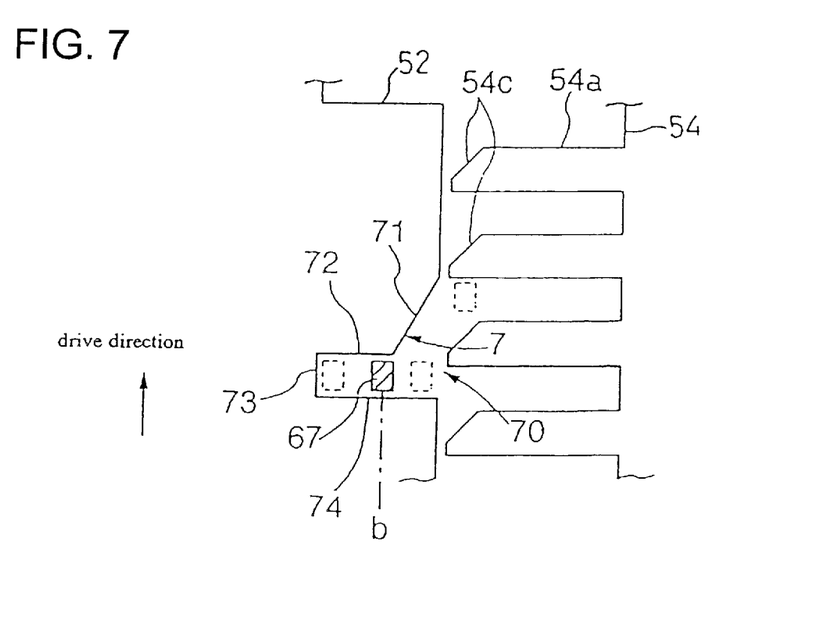
FIG. 7 is a detailed diagram showing the position of an engagement component of a clutch in relation to a depression formed in the gear rack and a serration formed in a ring gear when the transmission is in a medium speed state.

The medium speed step can be realized by setting the clutch body 6 to an intermediate position located between the first position and the second position, that is, by setting the engagement component 67 to the b position. This state is shown in FIGS. 3 and 7. The forward rotational power received by the driver 3 through the chain is transmitted via the clutch body 6 to the gear rack 52, which is still engaged with the engagement component 67 of the clutch body 6. Since the oscillating pawl 16a of the pawl clutch 16 has been separated from the ratchet 44 by the step 68 of the second clutch member 65, the forward rotational power imparted to the gear rack 52 is transmitted directly as it is to the hub body 4 via the roller clutch 17. When the pedal is turned backward in this state in order to brake, the engagement component 67 hits the side surface 74 of the depression 70, just as in the high speed step, and transmits the reverse rotational power to the gear rack 52. When the gear rack 52 is driven backward, the roller clutch 17 is actuated and the hub body is braked.

Figure 4:
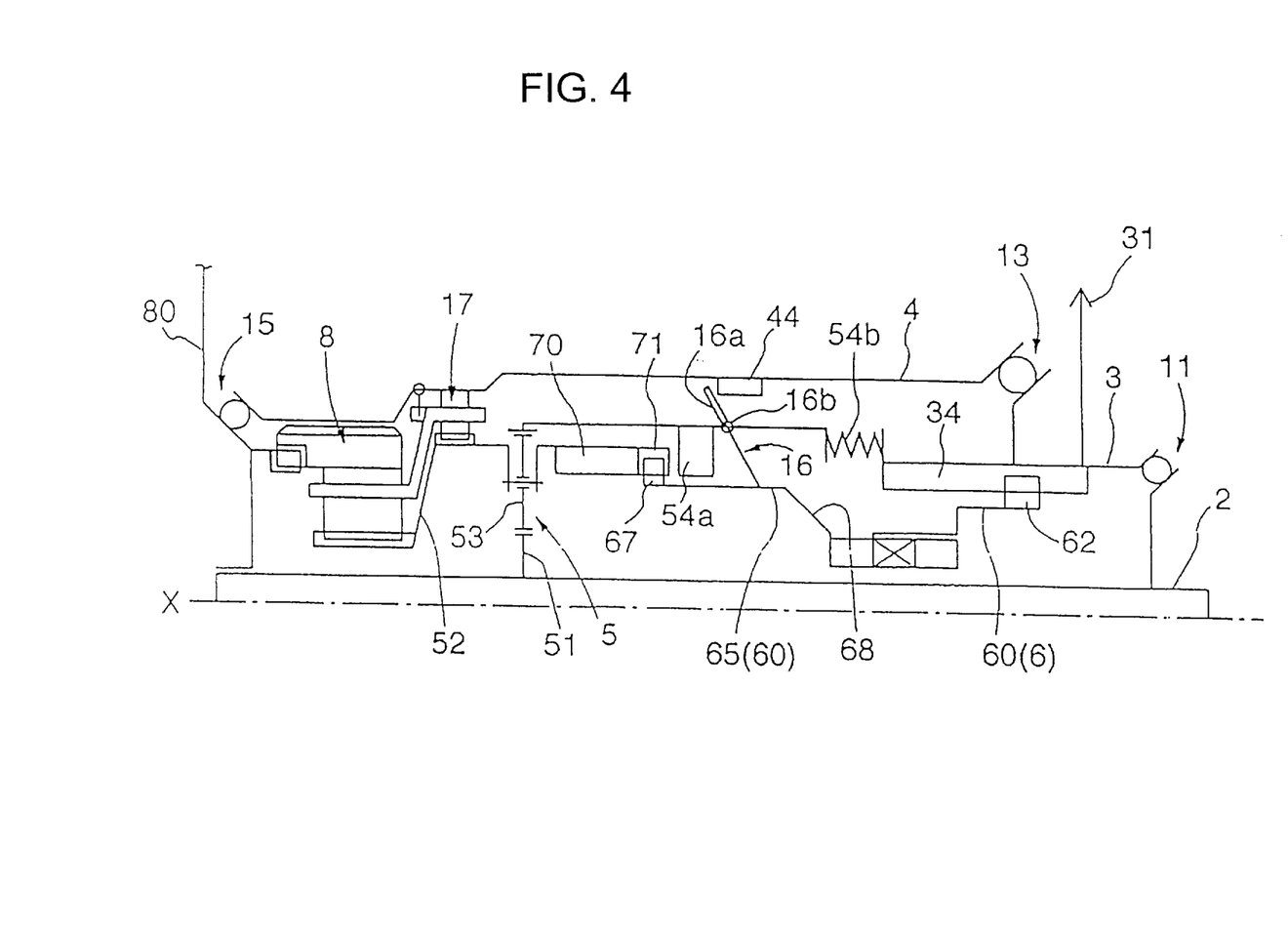
FIG. 4 is a schematic view of the transmission shown in FIG. 1 in a low speed state.
Figure 5:
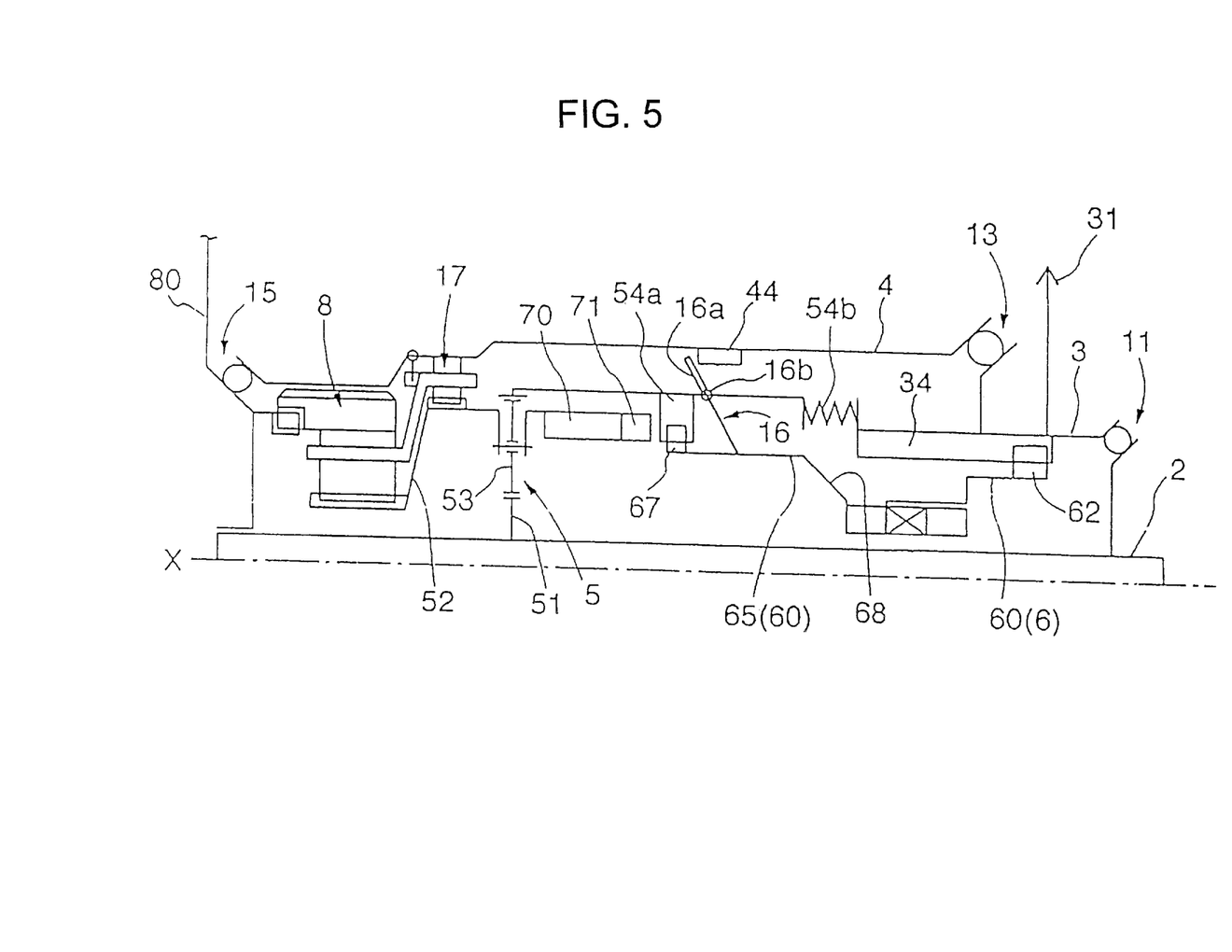
FIG. 5 is a schematic view of the transmission shown in FIG. 1 in a low speed state and reverse rotational power is applied to the transmission.
Figure 8:
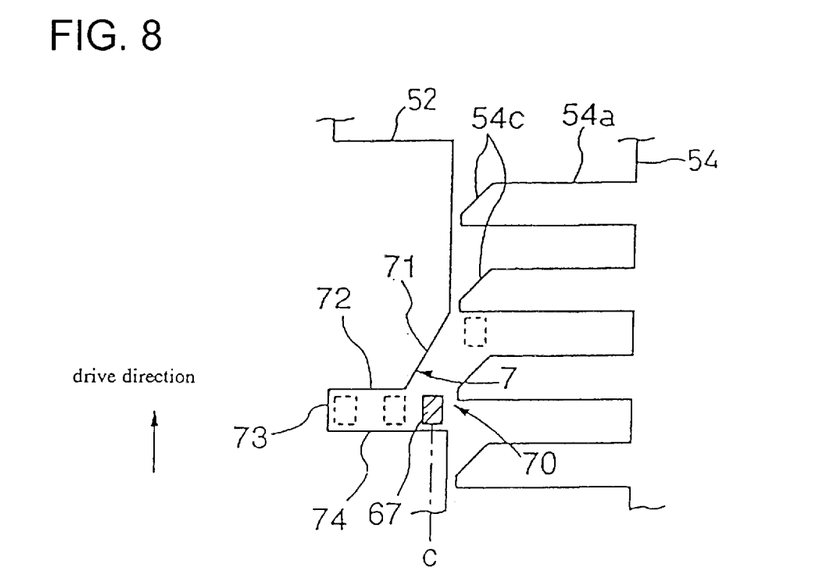
FIG. 8 is a detailed diagram showing the position of an engagement component of a clutch in relation to a depression formed in the gear rack and a serration formed in a ring gear when the transmission is in a standby state.
Figure 9:
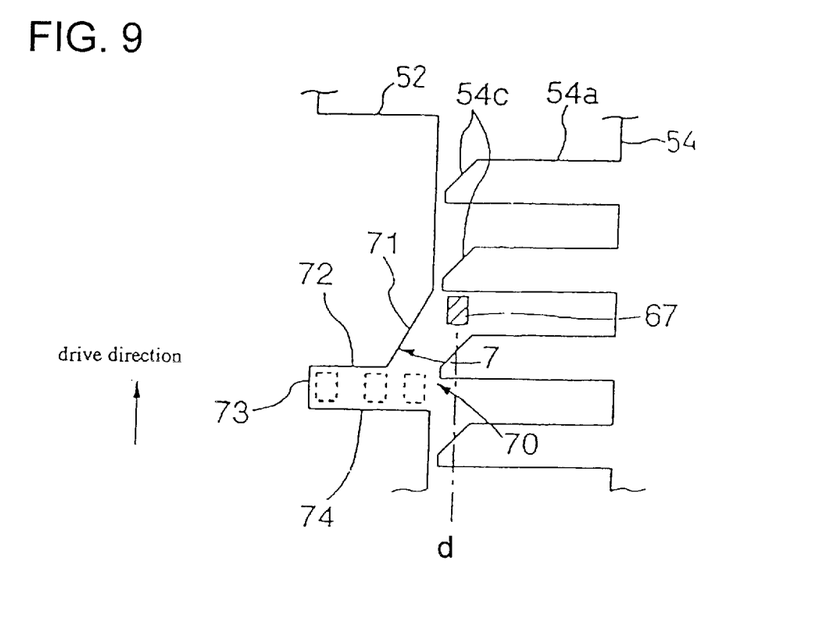
FIG. 9 is a detailed diagram showing the position of an engagement component of a clutch in relation to a depression formed in the gear rack and a serration formed in a ring gear when the transmission is in a low speed state.

The low speed step can be realized by bringing the clutch body 6 from the stand-by position to the second position, that is, by bringing the engagement component 67 from position c to d. This state is shown in FIGS. 5 and 9. The forward rotational power received by the driver 3 through the chain is transmitted via the clutch body 6 to the ring gear 54, which is engaged with the engagement component 67 of the clutch body 6. Since the oscillating pawl 16a of the pawl clutch 16 is still separated from the ratchet 44 by the step 68 of the second clutch member 65, the forward rotational power imparted to the ring gear 54 is decreased through the work of the planet gears 53 and the sun gear 51 before being transmitted to the gear rack 52 and is then transmitted to the hub body 4 through the roller clutch 17. When the pedal is turned backward in this state in order to brake, the engagement component 67 hits the inclined surface 54c formed on the side surface on the reverse rotation direction side of the serration 54a, the ring gear 54 is moved away from the gear rack 52, and the engagement component 67 enters the depression 70. When the clutch body 6 reaches the stand-by position between the intermediate position and the second position, that is, when the engagement component 67 moves to the position c, the engagement component 67 that is in contact with the side surface 74 of the depression 70 transmits the reverse rotational power to the gear rack 52 and actuates the roller brake 8. This state is shown in FIGS. 4 and 8. In other words, when forward rotational power is transmitted from the driver 3 to the clutch body 6 in a state in which the clutch body 6 has been set to the stand-by position by the operator 9, that is, in a state in which the engagement component 67 has been set to the position c, the engagement component 67 slides toward the ring gear 54 through the action of the inclined guide surface 71 and enters the serration 54a. As a result, the bicycle runs in the low speed step.

Because of the above, when the pedals are driven backward in order to brake, the clutch body 6 is always engaged with the gear rack 52, so the roller brake 8 can be actuated at a uniform level of torque regardless of whether the bicycle is ridden in the high speed step, the medium speed step, or the low speed step,.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A hub transmission with a coaster brake unit comprising:
   a hub axle (2);
   a drive member (3) rotatably mounted around the hub axle (2);
   a hub body (4) rotatably mounted around the hub axle (2);
   a planetary gear mechanism (5) coupled between the drive member (3) and the hub body (4) for communicating rotational force from the drive member (3) to the hub body (4) through multiple rotational force transmission paths, the planetary gear mechanism (5) including:
      a planet gear (53) supported by a planet gear rack (52) for rotation around the hub axle (2);
      wherein the gear rack (52) includes a depression (70) formed in a peripheral direction thereof;
      a ring gear (54) engaging the planet gear (53); and
      wherein the ring gear (54) includes a serration (54a) formed in a peripheral direction thereof;
   a clutch (6) movable in a direction of an axis (X) of the axle (2) between a first position (a,b), a standby position (c) and a second position (d), wherein the clutch (6) includes an engagement component (67);
   wherein the engagement component (67) engages with the depression (70) in the gear rack (52) for transmitting rotational power to the gear rack (52) when the clutch (6) is located in the first position (a,b) and the standby position (c);
   wherein the engagement component (67) engages with the serration (54a) in the ring gear (54) for transmitting forward rotational power to the ring gear (54) when the clutch (6) is located in the second position (d);
   wherein the serration (54a) includes an inclined surface (54c) for contacting the engagement component (67) when reverse rotational power is applied to the drive member (3) and the engagement component is located in the second position (d);
   biasing means (69) for biasing the clutch (6) from the second position (d) toward the standby position (c); and
   forcible movement means (71) for forcibly moving the clutch (6) from the standby position (c) toward the second position (d) when forward rotational power is applied to the drive member (3).

2. The hub transmission according to claim 1 wherein the forcible movement means (71) comprises an inclined surface (71) formed in the gear rack (52) for contacting the engagement component (67) and pushing the clutch (6) toward the serration (54a) when forward rotational power is applied to the drive member (3).

3. The hub transmission according to claim 2 wherein the depression (70) is defined by a contact surface (72), a side surface (74) and a bottom surface (73) formed on an annular portion of the gear rack (52).

4. The hub transmission according to claim 3 wherein the inclined surface (71) is located adjacent to the contact surface (72).

5. The hub transmission according to claim 3 wherein the serration (54a) is formed on an annular portion of the ring gear (54).

6. The hub transmission according to claim 1 wherein the ring gear (54) is movable in the direction of the axis (X) of the axle (2), and further comprising ring gear biasing means (54b) for biasing the ring gear (54) toward the gear rack (52).

7. The hub transmission according to claim 6 wherein the inclined surface (54c) contacts the engagement component (67) and pushes the ring gear (54) in the direction of the axis (X) of the axle (2) against the force of the ring gear biasing means (54b) when reverse rotational power is applied to the drive member (3).

8. The hub transmission according to claim 1 further comprising a first one-way transmission mechanism (16) disposed between the ring gear (54) and the hub body (4), and wherein the first one-way transmission mechanism (16) is structured for transmitting rotational force from the drive member (3) to the hub body (4) when the clutch (6) is located in the first position (a).

9. The hub transmission according to claim 8 wherein the clutch (6) includes a transmission disabling member (68) for disabling the first one-way transmission mechanism (16) when the clutch (6) is located in an intermediate position (b) between the first position (a) and the second position (d), and further comprising a second one-way transmission mechanism (17) disposed between the gear rack (52) and the hub body (4), wherein the second one-way transmission mechanism (17) is structured for transmitting rotational force from the drive member (3) to the hub body (4) when the clutch is located in the intermediate position (b).

10. The hub transmission according to claim 9 wherein the transmission disabling member (68) disables the first one-way transmission mechanism (16) when the clutch (6) is located in the second position (d), and wherein the second one-way transmission mechanism (17) is structured for transmitting rotational force from the drive member (3) to the hub body (4) when the clutch is located in the second position (d).

11. A hub transmission with a coaster brake unit comprising:
   a hub axle (2);

a drive member (3) rotatably mounted around the hub axle (2);

a hub body (4) rotatably mounted around the hub axle (2);

a planetary gear mechanism (5) coupled between the drive member (3) and the hub body (4) for communicating rotational force from the drive member (3) to the hub body (4) through multiple rotational force transmission paths, the planetary gear mechanism (5) including:

a planet gear (53) supported by a planet gear rack (52) for rotation around the hub axle (2);

wherein the gear rack (52) includes a plurality of depressions (70) formed in a peripheral direction thereof;

a ring gear (54) engaging the planet gear (53); and wherein the ring gear (54) includes a plurality of serrations (54a) formed in a peripheral direction thereof;

a clutch (6) movable in a direction of an axis (X) of the axle (2) between a first position (a,b), a standby position (c) and a second position (d), wherein the clutch (6) includes an engagement component (67);

wherein the engagement component (67) engages with at least one of the plurality of depressions (70) in the gear rack (52) for transmitting rotational power to the gear rack (52) when the clutch (6) is located in the first position (a,b) and the standby position (c);

wherein the engagement component (67) engages with at least one of the plurality of serrations (54a) in the ring gear (54) for transmitting forward rotational power to the ring gear (54) when the clutch (6) is located in the second position (d);

wherein each of the plurality of serrations (54a) includes an inclined surface (54c) for contacting the engagement component (67) when reverse rotational power is applied to the drive member (3) and the engagement component is located in the second position (d)

biasing means (69) for biasing the clutch (6) from the second position (d) toward the standby position (c); and forcible movement means (71) for forcibly moving the clutch (6) from the standby position (c) toward the second position (d) when forward rotational power is applied to the drive member (3).

12. The hub transmission according to claim 11 wherein the forcible movement means (71) comprises an inclined surface (71) formed in the gear rack (52) for contacting the engagement component (67) and pushing the clutch (6) toward the plurality of serrations (54a) when forward rotational power is applied to the drive member (3).

13. The hub transmission according to claim 12 wherein each of the plurality of depressions (70) is defined by a contact surface (72), a side surface (74) and a bottom surface (73) formed in a peripheral direction on an annular portion of the gear rack (52).

14. The hub transmission according to claim 13 further comprising a plurality of the inclined surfaces (71), wherein one of the plurality of inclined surfaces (71) is located adjacent to each contact surface (72).

15. The hub transmission according to claim 14 wherein the plurality of serrations (54a) are formed in a peripheral direction on an annular portion of the ring gear (54).

16. The hub transmission according to claim 15 wherein a distance (D1) in the peripheral direction between the contact surface (72) of each depression (70) and the side surface (74) of the depression (72) adjacent to it is greater than a pitch (D2) in the peripheral direction of the plurality of serrations (54a).

17. The hub transmission according to claim 11 wherein the ring gear (54) is movable in the direction of the axis (X) of the axle (2), and further comprising ring gear biasing means (54b) for biasing the ring gear (54) toward the gear rack (52).

18. The hub transmission according to claim 17 wherein the inclined surface (54c) contacts the engagement component (67) and pushes the ring gear (54) in the direction of the axis (X) of the axle (2) against the force of the ring gear biasing means (54b) when reverse rotational power is applied to the drive member (3).

19. The hub transmission according to claim 11 further comprising a first one-way transmission mechanism (16) disposed between the ring gear (54) and the hub body (4), and wherein the first one-way transmission mechanism (16) is structured for transmitting rotational force from the drive member (3) to the hub body (4) when the clutch (6) is located in the first position (a).

20. The hub transmission according to claim 19 wherein the clutch (6) includes a transmission disabling member (68) for disabling the first one-way transmission mechanism (16) when the clutch (6) is located in an intermediate position (b) between the first position (a) and the second position (d), and further comprising a second one-way transmission mechanism (17) disposed between the gear rack (52) and the hub body (4), wherein the second one-way transmission mechanism (17) is structured for transmitting rotational force from the drive member (3) to the hub body (4) when the clutch is located in the intermediate position (b).

21. The hub transmission according to claim 20 wherein the transmission disabling member (68) disables the first one-way transmission mechanism (16) when the clutch (6) is located in the second position (d), and wherein the second one-way transmission mechanism (17) is structured for transmitting rotational force from the drive member (3) to the hub body (4) when the clutch is located in the second position (d).

22. A hub transmission with a coaster brake unit comprising:

a hub axle (2);

a drive member (3) rotatably mounted around the hub axle (2);

a hub body (4) rotatably mounted around the hub axle (2);

a planetary gear mechanism (5) coupled between the drive member (3) and the hub body (4) for communicating rotational force from the drive member (3) to the hub body (4) through multiple rotational force transmission paths, the planetary gear mechanism (5) including:

a planet gear (53) supported by a planet gear rack (52) for rotation around the hub axle (2);

wherein the gear rack (52) includes a depression (70) formed in a peripheral direction thereof;

a ring gear (54) engaging the planet gear (53); and a clutch (6) for selectively transmitting rotational force from the drive member (3) to the hub body (4) through the multiple rotational force transmission paths, wherein the clutch (6) includes an engagement component (67); and forcible movement means (54c,69) for forcibly moving the clutch (6) so that the engagement component (67) engages with the depression (70) when reverse rotational power is applied to the drive member (3) and the clutch (6) is initially positioned for transmitting forward rotational power through each and all of the multiple rotational force transmission paths.

* * * * *